(12) United States Patent
Aida et al.

(10) Patent No.: US 8,821,020 B2
(45) Date of Patent: Sep. 2, 2014

(54) MOTION GUIDE DEVICE AND METHOD OF PRODUCING THE SAME

(75) Inventors: Tomoyuki Aida, Tokyo (JP); Ayako Misawa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 654 days.

(21) Appl. No.: 12/593,814

(22) PCT Filed: Mar. 27, 2008

(86) PCT No.: PCT/JP2008/055931
§ 371 (c)(1),
(2), (4) Date: Sep. 29, 2009

(87) PCT Pub. No.: WO2008/123371
PCT Pub. Date: Oct. 16, 2008

(65) Prior Publication Data
US 2010/0150483 A1   Jun. 17, 2010

(30) Foreign Application Priority Data

Mar. 29, 2007   (JP) .................................. 2007-089736
Sep. 14, 2007   (JP) .................................. 2007-240124

(51) Int. Cl.
*F16C 29/06* (2006.01)
*B21D 53/10* (2006.01)
*F16C 29/00* (2006.01)

(52) U.S. Cl.
CPC ............ *F16C 29/0659* (2013.01); *F16C 29/005* (2013.01); *F16C 29/0602* (2013.01)
USPC ........................ 384/43; 29/898.03; 29/898.063

(58) Field of Classification Search
USPC .................. 29/525.01, 525.11, 527.1, 898.06, 29/898.063; 74/89.23, 89.33; 384/43–45
See application file for complete search history.

(56) References Cited

U.S. PATENT DOCUMENTS 4,475,776 A * 10/1984 Teramachi .................... 384/45
4,496,198 A *  1/1985 Geka ............................ 384/44
(Continued)

FOREIGN PATENT DOCUMENTS

EP   0558761 A1   9/1993
EP   0743465 A1   11/1996
(Continued)

OTHER PUBLICATIONS

Machine Translation of JP 05-248434 dated Sep. 1993.*
(Continued)

*Primary Examiner* — Alan B Waits
(74) *Attorney, Agent, or Firm* — Westerman, Hattori, Daniels & Adrian, LLP

(57) ABSTRACT

The motion guide device has a raceway rail having a rolling-element rolling part; a moving block having a loaded rolling-element rolling part facing the rolling-element rolling part and a rolling-element circulation passage including a rolling-element return passage extending approximately in parallel with the loaded rolling-element rolling part; and a plurality of rolling elements arranged in the rolling-element circulation passage. The moving block has a rolling part made of steel and having the loaded rolling-element rolling part, a mounting part connected to the rolling part, having a mounting surface for mounting the moving block onto a counterpart device and having a specific gravity lower than that of the rolling part, and a return part made of resin and having the rolling-element return passage.

16 Claims, 17 Drawing Sheets

(56) References Cited

U.S. PATENT DOCUMENTS

| | | | |
|---|---|---|---|
| 4,576,420 A * | 3/1986 | Lehmann et al. | 384/45 |
| 4,614,382 A * | 9/1986 | Teramachi | 384/45 |
| 4,630,872 A * | 12/1986 | Teramachi | 384/45 |
| 4,688,950 A * | 8/1987 | Yokota | 384/44 |
| 5,013,164 A * | 5/1991 | Tsukada | 384/45 |
| 5,380,099 A * | 1/1995 | Teramachi | 384/45 |
| 5,582,487 A * | 12/1996 | Teramachi | 384/45 |
| 5,755,515 A * | 5/1998 | Senjo et al. | 384/45 |
| 6,085,420 A * | 7/2000 | Konomoto | 29/898.03 |
| 6,857,780 B2 * | 2/2005 | Morr et al. | 384/15 |
| 2002/0067869 A1 * | 6/2002 | Michioka et al. | 384/45 |
| 2004/0086209 A1 * | 5/2004 | Ueno | 384/45 |
| 2004/0190801 A1 * | 9/2004 | Kato et al. | 384/51 |
| 2005/0078892 A1 * | 4/2005 | Takahashi et al. | 384/45 |
| 2005/0232520 A1 | 10/2005 | Yamazaki et al. | |
| 2006/0088232 A1 | 4/2006 | Koeniger et al. | |
| 2007/0071579 A1 * | 3/2007 | Harnisch | 414/14 |
| 2008/0253703 A1 * | 10/2008 | Michioka et al. | 384/49 |

FOREIGN PATENT DOCUMENTS

| | | | | |
|---|---|---|---|---|
| JP | 59-040620 A | | 3/1984 | |
| JP | 05248434 A | * | 9/1993 | F16C 29/06 |
| JP | 7-018448 A | | 3/1995 | |
| JP | 7-317762 A | | 12/1995 | |
| JP | 8-326747 A | | 12/1996 | |
| JP | 2000-320553 A | | 11/2000 | |
| JP | 2004-108475 A | | 4/2004 | |
| JP | 3550208 B2 | | 8/2004 | |
| JP | 2005-009664 A | | 1/2005 | |
| JP | 2005-083394 A | | 3/2005 | |

OTHER PUBLICATIONS

BMJ Mold and Engineering. [online][retrieved on Apr. 30, 2006]. Retrieved from the Internet: <URL: http://www.bmjmold.com/inset-mold-bmj.htm>.*

International Search Report of PCT/JP2008/055931, mailing date of Jul. 1, 2008.

Notification of Transmittal of Translation of the International Preliminary Report on Patentability (Form PCT/IB/338) of International Application No. PCT/JP2008/055931 mailed Oct. 29, 2009 with Forms PCT/IB/373 and PCT/ISA/237.

European Search Report dated Nov. 21, 2011, issued in corresponding European Patemt Application No. 08739060.5.

Chinese Office Action dated Dec. 21, 2010, issued in corresponding Chinese Patent Application No. 200880009805.5.

* cited by examiner

MOTION GUIDE DEVICE AND METHOD OF PRODUCING THE SAME

TECHNICAL FIELD

The present invention relates to a motion guide device for guiding an object such as a table to move linearly or curvilinearly such as linear guide, a spline, and a method of producing the same.

BACKGROUND ART

As a mechanical element for guiding linear or curvilinear of an object such as a table, there is known a motion guide device having rolling elements such as balls or rollers in a guide part. As agile motion is obtained, the motion guide device is utilized in various fields including robots, machining tools, semiconductor/liquid crystal manufacturing devices, medical machines and the like.

One of such motion guide devices is a linear guide having a raceway rail mounted on a base and a moving block mounted on the raceway rail to be movable relative to the raceway rail. In the raceway rail, a rolling-element rolling part is formed extending in the longitudinal direction. In the moving block, a loaded rolling-element rolling groove is formed facing the rolling-element rolling part and a rolling-element circulation passage is provided for circulating rolling elements. Between the rolling-element rolling part of the raceway rail and the loaded rolling-element rolling part of the moving block, rolling elements are arranged. When the moving block moves linearly relative to the raceway rail, the rolling elements roll between the raceway rail and the moving block.

In these days, weight reduction is also desired for motion guide devices as mechanical elements. Particularly, weight reduction is desired for customer motion guide devices on which heavy load is not applied, motion guide devices which are built in multi-joint robots, motion guide devices which are built in XY tables and the like.

As a technique for weight reduction of a moving block of a motion guide device, the patent document 1 discloses a moving block having a core 21 where rolling-element rolling parts 21a are formed and a molded body 22 made of resin or aluminum around the core 21, the core 21 being inserted into a die and the molded body 22 being formed integral with the core 21, as illustrated in FIG. 23.

The patent document 2 discloses a moving block having a hollow block 31 in which rolling-element rolling parts 31a are formed, the hollow block 31 being filled with a filling material 32 of resin or aluminum, which is illustrated in FIG. 24.

The patent document 3 discloses a moving block having a rolling plate made of stainless-steel where rolling-element rolling parts 41a are formed, a mounting plate 42 made of stainless-steel for mounting the moving block onto a counterpart device and a molded body 43 made of resin integrally formed with these plates 41 and 42.

[Patent Document 1] Japanese Patent No. 3550208
[Patent Document 2] Japanese Patent Application Laid-open No. 8-326747
[Patent Document 3] Japanese Patent Publication No. 7-18448

DISCLOSURE OF THE INVENTION

Problem to be Solved by the Invention

One moving block is divided into the following three parts in view of its internal function. First is a rolling-element rolling part where rolling elements roll. As this rolling-element rolling part needs higher strength, it is made of heat-treatable steel. Second one is a mounting surface for mounting onto a counterpart device. As a load of the counterpart device is applied to the mounting surface, the mounting surface needs some degree of strength, however it does not need to be treated thermally as the rolling elements does not roll. The third one is a rolling-element return passage part for circulating rolling elements. As the rolling-element return passage part is a part only where the rolling-element pass, it does not need as much strength as the former two parts and it only needs to be shaped.

When attention is given to the above-mentioned three parts, the conventional weight-reduced moving blocks have the following problems. For the moving block disclosed in the patent document 1, both of the mounting surface part and the rolling-element return passage part are made of resin or aluminum. However, when they are made of resin, the mounting surface part lacks in strength, and when the mounting surface part and the rolling-element return passage part are made of aluminum, weight is reduced enough but mass productivity is lowered. For the moving blocks disclosed in the patent documents 2 and 3, as the mounting surface part is made of steel like the rolling-element rolling part, weight reduction can not be achieved enough.

In other words, in all of the moving blocks, the three parts are made of two materials. Hence, two of the three parts are made of the same materials. In such a case, if weight reduction is desired, the strength can not be sufficient, while if the strength is to be kept sufficient, the weight reduction can not be achieved enough.

Then, the present invention has an object to provide a motion guide device achieving both of high strength and weight reduction and yet having excellent mass-productivity and a method of producing the same.

Means for Solving the Problem

A description on the present invention will now be given below.

In order to solve the above-mentioned problems, the invention of claim 1 is a motion guide device comprising: a raceway member having a rolling-element rolling part; a moving block having a loaded rolling-element rolling part facing the rolling-element rolling part and a rolling-element circulation passage including a rolling-element return passage extending approximately in parallel with the loaded rolling-element rolling part; a plurality of rolling elements arranged in the rolling-element circulation passage; and the moving block having a rolling part which is made of steel and has the loaded rolling-element rolling part, a return part which is made of resin and has the rolling-element return passage, and amounting part which is connected to the rolling part, has a mounting surface for mounting the moving block onto a counterpart device, and is made of a material that has a specific gravity lower than that of the rolling part and is more rigid than that of the return part.

The invention of claim 2 is characterized in that, in the motion guide device of claim 1, the mounting part is connected to the rolling part with a plurality of bolts or an adhesive agent.

The invention of claim 3 is characterized in that, in the motion guide device of claim 1 or 2, the return part is formed of resin to be integral with the rolling part and the mounting part.

The invention of claim 4 is characterized in that, in the motion guide device of claim 2, the mounting part is connected with the rolling part with the bolts, and in a plane view of the moving block, a plurality of mounting screws for mounting the moving block onto the counterpart device are arranged in the mounting surface of the mounting part to be bilaterally symmetric about a center line of the moving block in a travelling direction, and the bolts for connecting the rolling part and the mounting part are arranged bilaterally symmetric about the center line of the moving block in the travelling direction in such a manner that the bolts are close to the mounting screws.

The invention of claim 5 is characterized in that, in the motion guide device of claim 1 or 2, the rolling part has a center part facing an upper surface of the raceway member and a pair of leg parts hanging down from respective ends of the center part in a width direction thereof and facing respective side surfaces of the raceway member, and each of the leg parts has a base part and a tip end part, the base part being thicker than the tip end part.

The invention of claim 6 is characterized in that, in the motion guide device of claim 1 or 2, the mounting part has a through hole extending in a travelling direction of the moving block and at least a part of the return part is provided in the through hole.

The invention of claim 7 is characterized in that, in the motion guide device of claim 1 or 2, the mounting part is made of aluminum, aluminum base alloy, ceramics or FRP.

The invention of claim 8 is characterized in that, in the motion guide device of claim 2, the mounting part is connected to the rolling part with the bolts, and the motion guide device further comprises displacement preventing means for preventing the mounting part from being horizontally displaced relative to the rolling part when seen in a longitudinal direction of the raceway member while joint surfaces of the rolling part and the mounting part in contact with each other are arranged in a horizontal plane.

The invention of claim 9 is characterized in that, in the motion guide device of claim 8, the displacement preventing means has an adhesive groove provided in at least one of the joint surfaces of the mounting part and the rolling part and an adhesive agent filled in the adhesive groove.

The invention of claim 10 is characterized in that, in the motion guide device of claim 8, the displacement preventing means has holes provided in the respective joint surfaces of the rolling part and the mounting part in such a manner that positions of the respective joint surfaces are matched to each other and a pin fit in the holes.

The invention of claim 11 is characterized in that, in the motion guide device of claim 8, the displacement preventing means has a stopper jutting out of the joint surface of the mounting part in a vertical direction and abutting to a side surface of the rolling part.

The invention of claim 12 is characterized in that, in the motion guide device of claim 3, the mounting part has a resin joint surface connected to the return part, the resin joint surface having a groove into which resin flows in molding so as to prevent a gap from occurring between the resin joint surface and the return part due to shrinkage of the resin after molding.

The invention of claim 13 is a method of producing a motion guide device having a raceway member having a rolling-element rolling part, a moving block having a loaded rolling-element rolling part facing the rolling-element rolling part and a rolling-element circulation passage including a rolling-element return passage extending approximately in parallel with the loaded rolling-element rolling part, and a plurality of rolling elements arranged in the rolling-element circulation passage, the method comprising: a first connecting step of connecting a mounting part to a rolling part made of steel having the loaded rolling-element rolling part, the mounting part having a mounting surface for mounting the moving block onto a counterpart device and being made of a material that has a lower specific lower than that of the rolling part and is more rigid than that of a return part made of resin having the rolling-element return passage; and a second connecting step of connecting the return part made of resin having the rolling-element return passage to the rolling part and the mounting part.

The invention of claim 14 is characterized in that, in the method of claim 13, in the first connecting step, the rolling part is connected to the mounting part with a plurality of bolts or an adhesive agent.

The invention of claim 15 is characterized in that, in the method of claim 13 or 14, in the second connecting step, the return part made of resin is formed of resin to be integral with the rolling part and the mounting part by inserting the rolling part and the mounting part into a die as a core and performing injection molding of resin in the die.

The invention of claim 16 is characterized by, in the method of claim 13 or 14, further comprising: after the first connecting step of connecting the mounting part to the rolling part, a rolling part finishing step of forming the loaded rolling-element rolling part of the rolling part by grinding.

Effect of the Invention

According to the invention of claim 1, the rolling part of the moving block having the rolling-element rolling part is made of the heat-treatable steel, the mounting part having the mounting surface for mounting onto the counterpart device (the mounting part does not need heat treatment) is made of the material having lower specific gravity than the steel and the return part that only needs to be shaped is made of resin. As the three materials having different strength and specific gravity are arranged respective appropriate parts of the moving block, the moving block can combine the high strength with the weight reduction.

According to the invention of claim 2, the rolling part and the mounting part can be connected to each other without performing die casting in which the rolling part made of steel is inserted into a die and the mounting part made of metal is die-casted. If the die casting is performed, the loaded rolling-element rolling part of the rolling part is hard to heat treat. This is because, if die casting of the mounting part is performed after heat treatment of the loaded rolling-element rolling part of the rolling part, the heat-treated loaded rolling-element rolling part of the rolling part is affected by die casting. Meanwhile, if the loaded rolling-element rolling part of the rolling part is heat-treated after die casting of the mounting part, the die-casted mounting part gets melted in heat treatment.

According to the invention of claim 3, the return part can be connected to the rolling part and the mounting part integrally. As the temperature in resin molding is not so high as the temperature in die casting, if the rolling part and the mounting part are inserted, the heat-treated loaded rolling-element rolling part of the rolling part is not affected thereby.

According to the invention of claim 4, as the position of each bolt for connecting the rolling part to the mounting part is close to the position of a corresponding mounting screw for mounting onto the counterpart device, when a reverse radial load for pulling the moving block from the raceway member in the upward direction is applied to the moving block, the mounting part can be prevented from being deformed.

According to the invention of claim 5, if the moving block bears a radial load for pushing the moving block against the raceway member and a reverse radial load for pulling the moving block from the raceway rail, the leg parts of the rolling part can be prevented from being deformed.

According to the invention of claim 6, as the through hole is formed in the mounting part of larger specific gravity and at least a part of the return part is provided in the through hole, the moving block can be weight-reduced.

According to the invention of claim 7, it becomes possible to obtain the metal having intermediate gravity and strength between the steel and resin.

According to the invention of claim 8, it becomes possible to prevent displacement of the mounting part and the rolling part even when a horizontal load is applied to the moving block. The moving block of the motion guide device bears not only the load in the radial direction (vertically upward) and the load in the reverse radial (vertically downward), but also a load in the horizontal direction. As compared with the case where the moving block bears the horizontal load only by a frictional force of the bolt bearing surface, the motion guide device of the present invention can achieve improved product safety.

According to the invention of claim 9, as the mounting part and the rolling part are adhered to each other with the adhesive agent of higher shearing force, they can be prevented from being displaced from each other. The strength (resistant force against displacement) can be ensured by setting the strength of the adhesive agent itself and the adhesion area appropriately.

According to the invention of claim 10, as the pin is provided between the mounting part and the rolling part, the shearing force of the pin can be used thereby to prevent the mounting part and the rolling part from being displaced from each other. The strength (resistant force against displacement) can be ensured by setting the diameter of the through hole or diameter of the pin appropriately.

According to the invention of claim 11, as the stopper that abuts to the rolling part is provided in the rolling part, they can be prevented from being displaced from each other. The shearing force and flexural strength of the stopper can be achieved by setting the dimensions of the stopper appropriately. As compared with the case of connecting with the adhesive agent or pin, it becomes possible to reduce the process steps and thereby facilitate manufacturing.

According to the invention of claim 12, it becomes possible to prevent any gap from occurring between the mounting part and the return part due to shrinkage of resin after molding and it is also possible to prevent displacement of the rolling-element return passage.

According to the invention of claim 13, as the three materials having different strength and specific gravity are arranged respective appropriate parts of the moving block, the moving block can combine the high strength with the weight reduction.

According to the invention of claim 14, the rolling part can be connected to the mounting part without die casting that makes heat treatment difficult.

According to the invention of claim 15, the return part can be connected to the rolling part and the mounting part integrally. As the temperature in resin molding is not so high as the temperature in die casting, if the rolling part and the mounting part are inserted, the heat-treated loaded rolling-element rolling part of the rolling part is not affected thereby.

According to the invention of claim 16, it becomes possible to form the loaded rolling-element rolling part at a precise position with the mounting part to be mounted on the counterpart device used as a reference.

EXPLANATION OF REFERENCE NUMERALS

1 . . . raceway rail (raceway member), 1a . . . ball rolling groove (rolling-element rolling part), 2 . . . moving block, 3 . . . ball (rolling element), 8 . . . rolling part, 8a . . . center part, 8h . . . leg part, 8c . . . loaded ball rolling groove (loaded rolling-element rolling part), 8e . . . screw part, 8f . . . joint surface, 8g . . . hole (displacement preventing means), 9 . . . mounting part, 9a . . . mounting surface, 9h . . . countersunk hole, 9d . . . through hole, 9i . . . adhesive groove (displacement preventing means), 9h . . . joint surface, 9j . . . hole (displacement preventing means), 10 . . . return part, 10a . . . ball return passage (rolling-element return passage), 16 . . . stopper (displacement preventing means), 17 . . . adhesive agent (displacement preventing means), 18 . . . pin (displacement preventing means), 19 . . . resin joint surface of mounting part, 20 . . . groove into which resin flows

MODE FOR CARRYING OUT THE INVENTION

Figure 1:
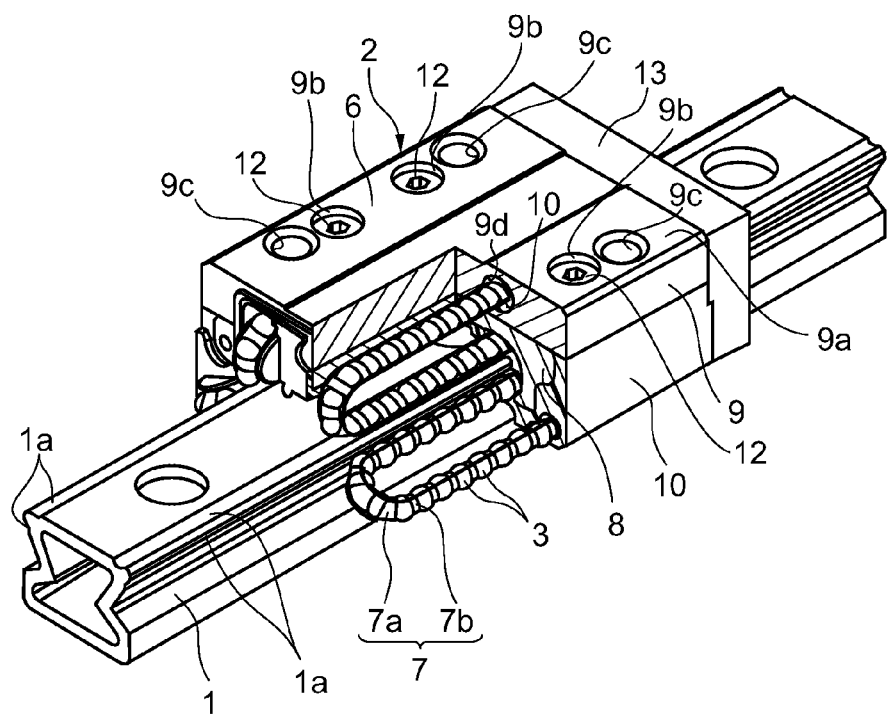
FIG. 1 is a perspective view of a motion guide device according to a first exemplary embodiment of the present invention (including a partial cross-sectional view).

FIG. 1 is a perspective view of a motion guide device according to a first exemplary embodiment of the present invention. This motion guide device has a raceway rail 1 as a raceway member and a moving block 2 sliding along the raceway rail 1. The raceway rail 1 is mounted on a base and the moving block 2 is mounted on a counterpart device as an object to guide. There are balls 3 as rolling elements rollable between the raceway rail 1 and the moving block 2.

Figure 2:
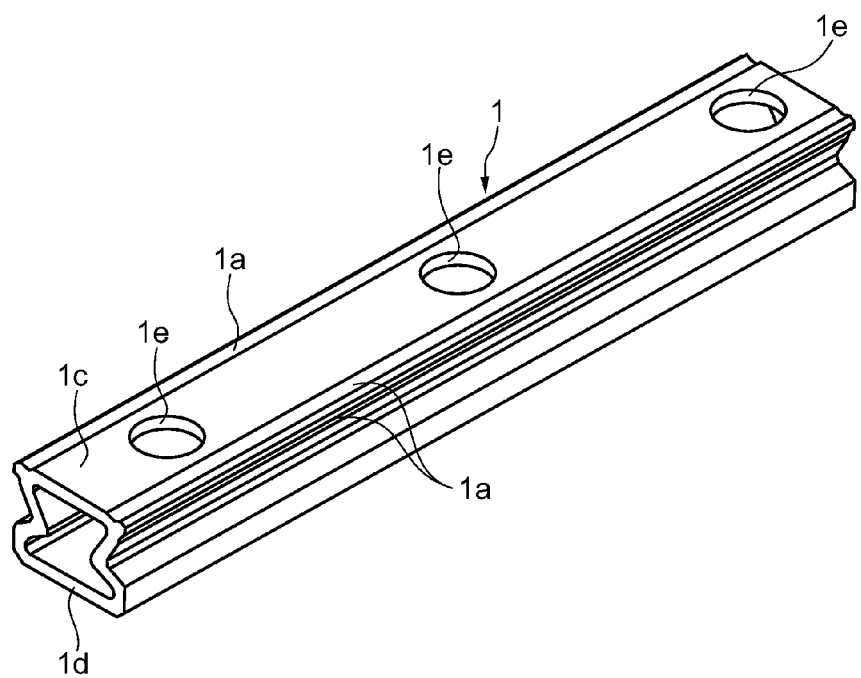
FIG. 2 is a perspective view of a raceway rail.

FIG. 2 illustrates the raceway rail 1 which is hollow. The raceway rail 1 has a modified cross section and is elongated linearly. At each of horizontal end parts of the upper surface of the raceway rail 1, for example, one ball rolling groove 1a is formed as a rolling-element rolling part extending in the longitudinal direction. Also at the upper part of each side surface of the raceway rail 1, for example, a ball rolling groove 1a is formed as a rolling-element rolling part extending in the longitudinal direction. In other words, there are four ball rolling grooves 1a formed in this exemplary embodiment. Each ball rolling groove 1a has a circular arc groove shaped cross section consisting of a single circular arc or a Gothic arch shaped cross section consisting of two circular arcs. The number of ball rolling grooves 1a and the contact angle between each ball rolling groove 1a and each ball 3 are set depending on a load of the motion guide device. As the ball 3 rolls, the ball rolling groove 1a is worked so as to have small surface roughness and high strength. In the upper plate 1c and the lower plate 1d of the hollow raceway rail 1, mounting holes 1e are formed for fixing the raceway rail 1 to the base. The diameter of each hole formed in the upper plate 1c is slightly larger than the diameter of a head part of a bolt for mounting the raceway rail 1 on the base. The diameter of the hole formed in the lower plate 1d is smaller than the diameter of the head part of the bolt and larger than the diameter of a screw part of the bolt.

Next description is made about a method for manufacturing the raceway rail 1. First, there is prepared a hot-extruded round or cornered pipe. The material of the pipe is steel such as carbon steel, chrome steel or stainless steels. Then, in order to adjust the pipe thickness and remove any defect on the surface, the pipe is made pass through a dice in drawing. Then, the pipe is made pass through a deformed dice by odd shape drawing. Through this odd shape drawing, the round or polygonal cross section of the pipe is plastically deformed into the cross-sectional shape of the raceway rail 1. Simultaneously with this odd shape drawing, the ball rolling grooves 1a of the raceway rail 1 are worked. Next, the ball rolling grooves 1a are hardened. After hardening, bent parts of the raceway rail 1 are straightened and the mounting holes are formed in the upper plate 1c and the lower plate 1d of the raceway rail 1. Finally the ball rolling grooves 1a are grinded.

As illustrated in FIG. 1, the moving block 2 is mounted on the raceway rail 1. The moving block 2 is formed into a saddle shape as a whole and has a moving block main body 6 and end plates 13 provided on respective ends of the moving block main body 6 in the moving direction. In FIG. 1, the end plate 13 at the front side is removed.

Figure 3:
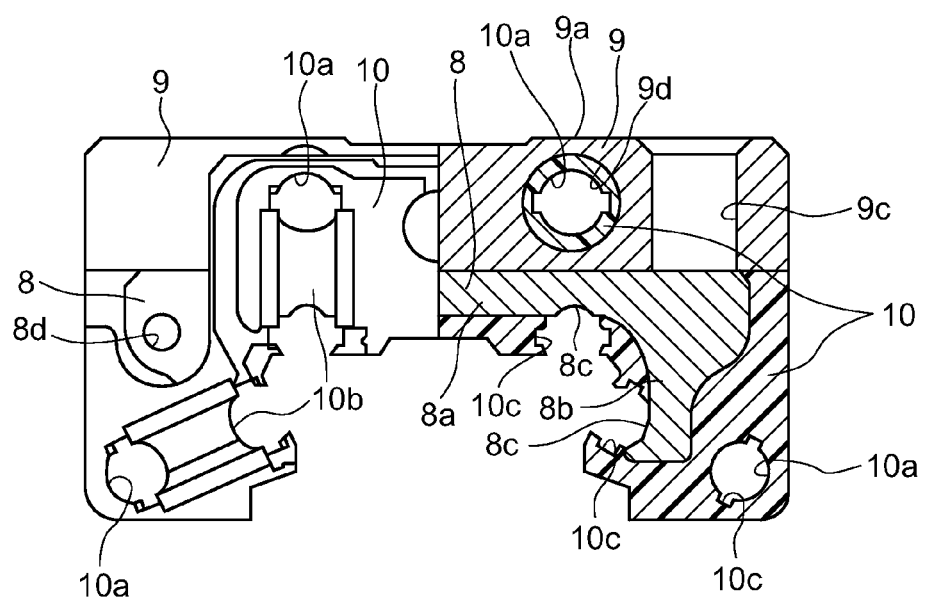
FIG. 3 is a side view of a moving block (including a partial cross-sectional view).

FIG. 3 is a side view of the moving block main body 6 seen in the axial direction of the raceway rail 1 (including a partial cross-sectional view). The moving block main body 6 has three parts, that is, a rolling part 8 made of steel in which the loaded ball rolling grooves are formed as loaded rolling-element rolling parts, a mounting part 9 made of aluminum having a mounting surface for mounting the moving block 2 on the counterpart device, and a return part 10 made of resin where the ball return passages 10a are formed as rolling-element return passages.

The rolling part 8 is made of steel, such as carbon steel, chrome steel or stainless steels. The rolling part 8 has a center part 8a facing the upper surface of the raceway rail 1, and a pair of leg parts 8b hanging from the respective width-directional ends of the center part 8a and corresponding to the side surfaces of the raceway rail 1. The base part of each leg part 8b is formed thicker than the tip end thereof. The rolling part 8 is C shaped and has totally four loaded ball rolling grooves 8c formed inside as loaded rolling-element rolling parts facing the ball rolling grooves 1a of the raceway rail 1. The two loaded ball rolling grooves 8c are formed in the center part of the rolling part 8 and the other loaded ball rolling grooves 8c are formed in the respective leg parts. As the ball 3 rolls, each loaded ball rolling groove 8c is formed to have small surface roughness and high strength. In the center part 8a of the rolling part 8, screw parts are formed where bolts 12 are fit for mounting the mounting part 9 on the rolling part 8 (see FIG. 1). In the mounting part 9, countersunk holes 9b are formed in which the bolts 12 are inserted. Besides, in both end surfaces of the leg parts of the rolling part 8, screw parts 8d are formed for mounting the endplates 13 to the rolling part 8.

The mounting part 9 is made of aluminum. The mounting part 9 has a very simple shape like one plate. The upper surface of the mounting part 9 serves as a mounting surface 9a for mounting the moving block 2 on the counterpart device. In the upper surface of the mounting part 9, plural mounting screws 9c are formed in which bolts are engaged to mount the moving block 2 onto the counterpart device. Each mounting screw 9c passes through the moving block 2 vertically. In addition, countersunk holes 9b (see FIG. 1) are formed in the mounting part 9. Inserted in the countersunk holes 9b are bolts 12 for connecting the rolling part 8 to the mounting part 9. In the mounting part 9, through holes 9d are formed extending in the travelling direction of the moving block 2. In each of these through holes 9d, a part of the return passage 10 of resin is provided.

Figure 4A:
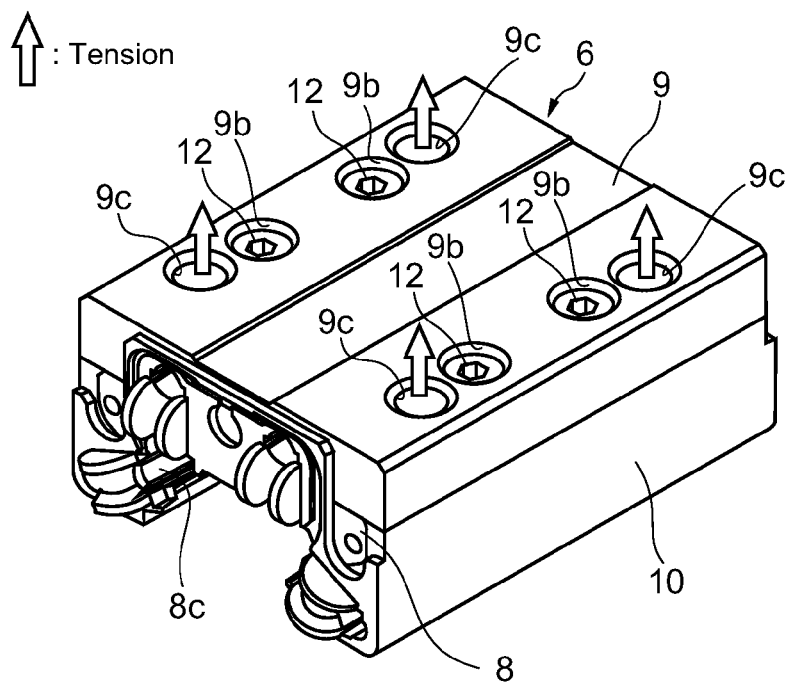
FIGS. 4A and 4B are perspective views of a moving block (FIG. 4A illustrating a moving block according to the first exemplary embodiment, and FIG. 4B illustrating a moving block according to a second exemplary embodiment).

As illustrated in FIG. 4A, in the mounting surface of the mounting part 9, the four mounting screws 9c are arranged symmetrically about the center line of the moving block 2. The four mounting screws 9c are arranged displaced from the center line of the moving block 2. The countersunk holes 9b into which the bolts 12 are inserted are also arranged symmetrically about the center line of the moving block 2. The positions of the countersunk holes 9b are, as illustrated in FIG. 4B, not on the center line in the travelling direction of the moving block 2, but close to the positions of the mounting screws 9c (In this exemplary embodiment, the mounting screws 9c and the countersunk holes 9b are horizontally equally spaced from the center line of the moving block 2).

Figure 4B:
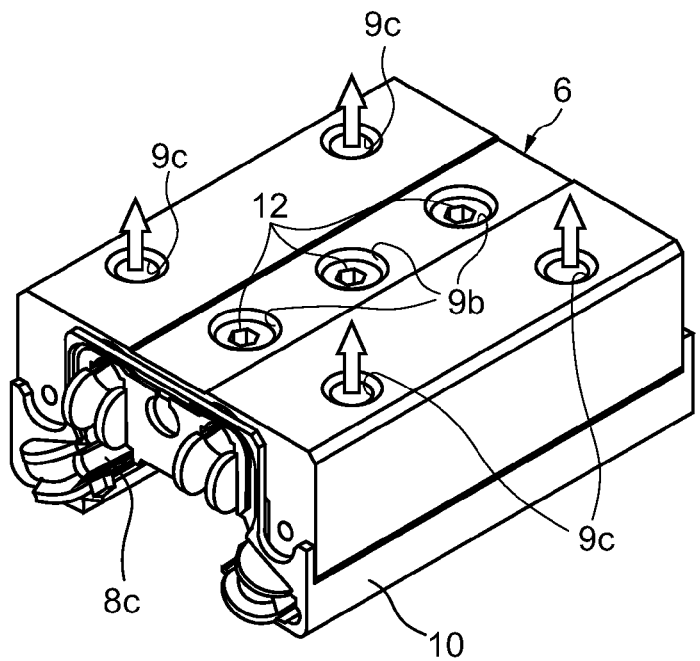

As illustrated in FIG. 4B, if the countersunk holes 9b are positioned on the center line of the moving block 2, when a reverse radial load is applied as indicated by the arrow in FIG. 4B the mounting part 9 is pulled and the width-directional ends of the mounting part 9 are deformed. As the position of each mounting screw 9c as the pulled part is made close to the position of the countersunk hole 9b in which the bolt is inserted, deformation of the mounting part 9 can be reduced.

The return part 10 is made of resin such as Torayca. The return part 10 does not have to have high strength and accuracy which are needed for the rolling part 8 and the mounting 9. The return part 10 has only to be formed into s predetermined shape. As illustrated in FIG. 3, in the return part 10, ball return passages 10a are formed as rolling-element return passages extending straightly in parallel with the loaded ball rolling grooves 8c. In the return part 10, four ball return passages 10a are formed equal in number to the loaded ball rolling grooves 8c. Out of the four ball return passages 10a, two ball return passages 10a at the upper side are formed inside the through holes of the mounting part 9 and the other two are formed inside the return part 10 itself. As the diameter of the ball return passage 10a is larger than the diameter of the ball 3, the ball 3 does not bear any load in the ball return passage 10a. The ball 3 moves inside the ball return passage 10 pushed by its following ball 3. The loaded ball rolling groove 8c and the ball return passage 10a extending in parallel with each other are connected via the U-shaped direction change passage. The inner circumferential side 10b of the direction change passage is also formed in the return part 10. The outer circumferential side of the direction change passage is formed in the end plate 13.

As illustrated in FIG. 1, the loaded ball rolling groove 8c, the ball return passage 10a and the U-shaped direction change passage form a circuit-like ball circulation passage, in which a plurality of balls 3 is arranged. The plural balls 3 are held in series by a band-shaped retainer 7. The retainer 7 has a plurality of spacers 7a for preventing contact between adjacent balls 3 and a band-shaped connecting part 7b for connecting the plural spacers 7a. In the return part 10, a guide groove 10c is formed for guiding the connecting part 7b of the retainer 7 (see FIG. 3).

When the moving block 2 is moved relative to the raceway rail 1, the plural balls 3 between them roll. Once each ball rolls up to an end of the loaded ball rolling groove 8c of the moving block 2, the ball 3 is scooped up into the U-shaped direction change passage by a scooping portion of the end plate 13. The ball 3 of which the travelling direction is changed in the direction change passage enters the ball return passage 10a. After passing through the ball return passage 10a, the ball 3 passes through the opposite-side direction change passage and enters the passage between the raceway rail 1 and the moving block 2.

The moving block main body 6 is manufactured in the following steps. First, drawing or cutting process is performed to shape the rolling part 8. At the same time of shaping the rolling part 8, the loaded ball rolling groove 8c is formed in the rolling part 8. Next, the screw parts 8d are formed in the center part 8a and leg parts 8b of the rolling part 8. Then, the rolling part 8 is hardened. As the rolling part 8 is distorted in the heat treatment, the distortion is removed by grinding.

The mounting part 9 is shaped by aluminum extrusion. If the mounting part 9 is shaped only by extrusion, the shape accuracy is lower. Therefore, after the extrusion, the outer shape is subjected to cutting. As the mounting surface 9a is a surface on which the counterpart device is mounted and it serves as a reference surface of the loaded ball rolling groove 8c, it is cut with high accuracy. In order to increase the strength, the surface of the mounting part 9 may be subjected to alumite processing.

Figure 5:
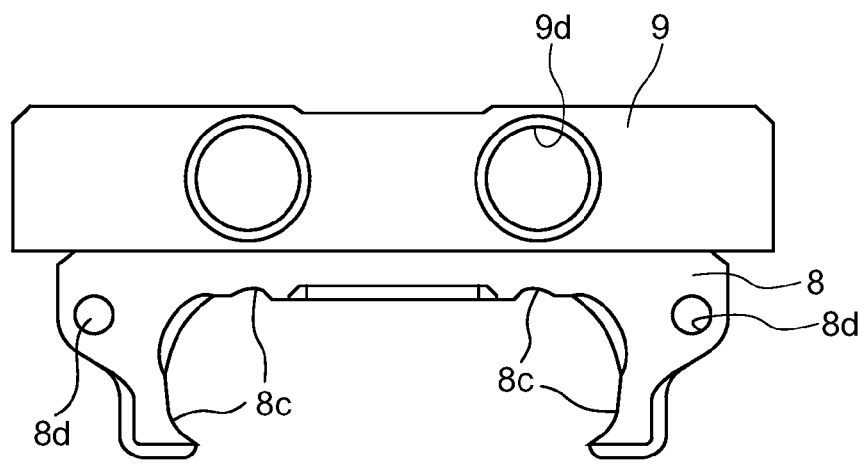
FIG. 5 is a side view illustrating a mounting part to which a rolling part is connected.

After the distortion of the rolling part 8 is removed, as illustrated in FIG. 5, the rolling part 8 is connected to the mounting part 9 with bolts 12. As the rolling part 8 and the mounting part 9 are fastened to each other with the bolts 12, there is no need to use die casting for connection of the rolling part 8 with the mounting part 9. If die casting is adopted, the heat treatment of the loaded ball rolling groove 8c of the rolling part 8 is made difficult. This is because if the loaded rolling groove 8c of the rolling part 8 is first treated thermally and then, the mounting part 9 is subjected to die casting, the heat-treated loaded ball rolling groove 8c of the rolling part is affected by the temperature of the liquid metal at 200° C. Meanwhile, when the mounting part 9 is first subjected to die casting and then, the loaded ball rolling groove 8c of the rolling part is treated thermally, the die-casted mounting part 9 is melt at the heat treatment temperatures of 1100 to 1200° C.

After the rolling part 8 is connected to the mounting part 9, the loaded ball rolling groove 8c of the rolling part 8 is grinded again. With the mounting surface of the mounting part 9 used as a reference, the loaded ball rolling groove 9c of the rolling part 8 is formed.

After the rolling part 8 is connected to the mounting part 9, these are inserted into a die. Then, resin is injection-molded by the die and the return part 19 is integrally connected to the rolling part 8 and the mounting part 9. The return part 10 has a complicated shape, however, it can be formed easily by injecting resin into the die. As the molding temperature of the resin is 100° C. or less, the heat-treated loaded ball rolling groove 8c of the rolling part 8 is not affected by this temperature.

The steel has merits of high rigidity and hardening capability, however, it has a demerit of greater specific gravity. The resin has merits of light weight and easy forming, however, it has demerits of low rigidity and easy deformation. Aluminum has intermediate property between the steel and the resin in terms of specific gravity and rigidity. In the moving block 2 of this exemplary embodiment, three materials are used in respective appropriate positions. Therefore, the motion guide device has both features of accurate movement under load and weight reduction. For example, as compared with a steel-made moving block, it can achieve 40% weight reduction without losing the rigidity.

Figure 6:
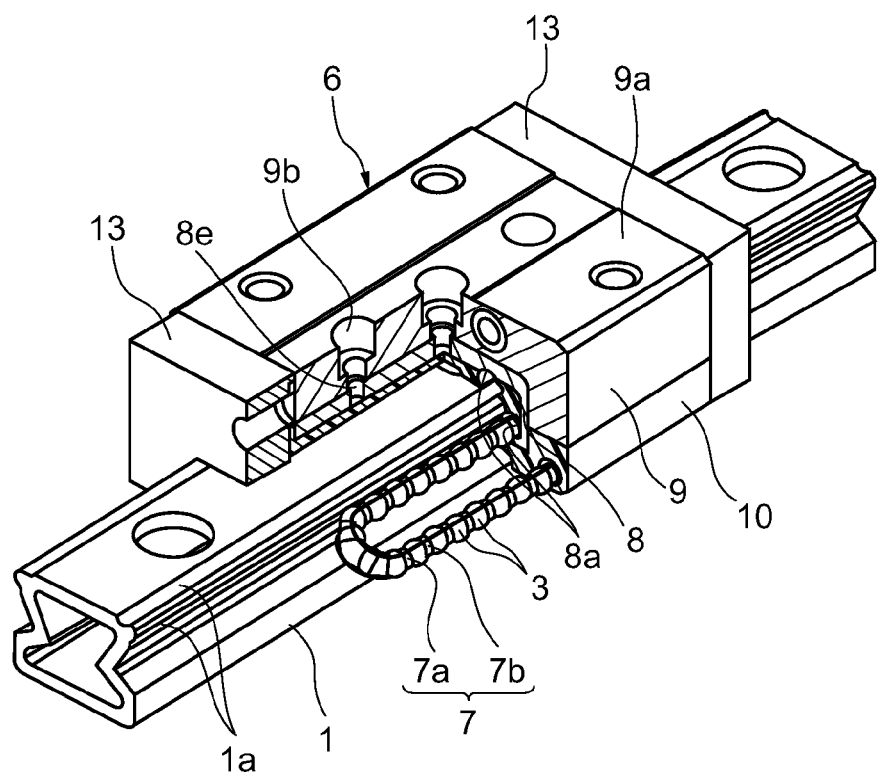
FIG. 6 is a perspective view of a motion guide device according to the second embodiment of the present invention (including a partial cross-sectional view).
Figure 7:
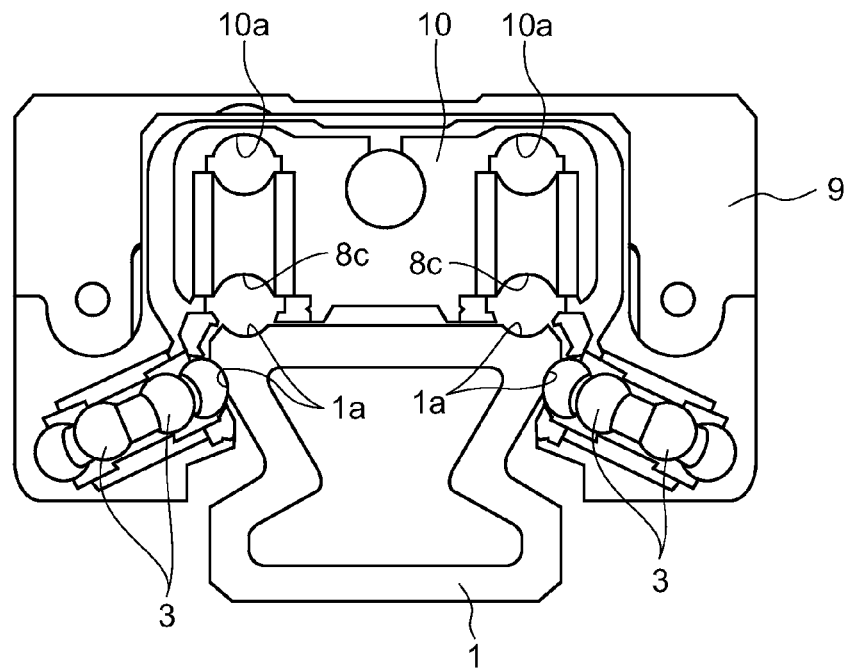
FIG. 7 is a front view of the motion guide device (an end plate is removed).

FIGS. 6 and 7 illustrate a motion guide device according to a second exemplary embodiment of the present invention. FIG. 6 is a perspective view of the motion guide device and FIG. 7 is a front view of the motion guide device (the end plate 13 is removed). As the raceway rail 1, the plural balls 3 held by the retainer 7 and the end plates 13 provided at respective end surfaces of the moving block main body 6 have the same structures as those in the above-described first exemplary embodiment, they are denoted by like reference numerals and their explanation is omitted here.

The moving block main body 8 has a rolling part 8 in which loaded ball rolling groove 8c are formed, a mounting part 9 having a mounting surface 9a and a return part 10 in which ball return passages 10a are formed.

Figure 8:
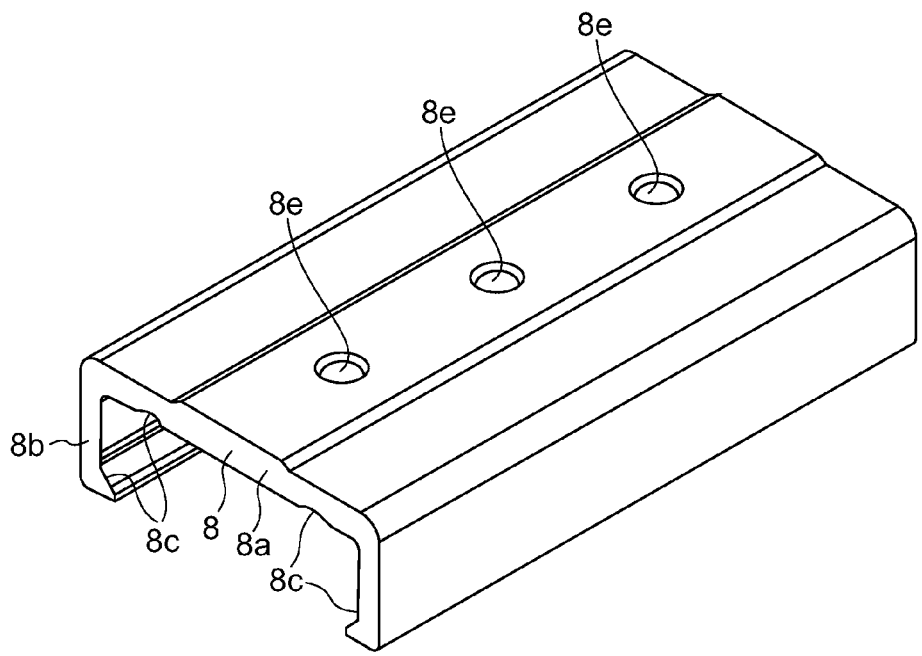
FIG. 8 is a perspective view of the rolling part.

FIG. 8 is a perspective view of the rolling part. The rolling part 8 is formed to have a U-shaped cross section and is made of steel. The rolling part in this exemplary embodiment is formed thinner than the rolling part 8 in the first exemplary embodiment. Inside the rolling part 8, four loaded ball rolling grooves 8c are formed. On the center line of a center part 8a of the rolling part 8, a plurality of screw parts 8e is formed. Engaged with this screw parts 8e are bolts for mounting the mounting part 9 to the rolling part 8. The rolling part 8 is manufactured in the same process steps as those in the above-described exemplary embodiment.

Figure 9:
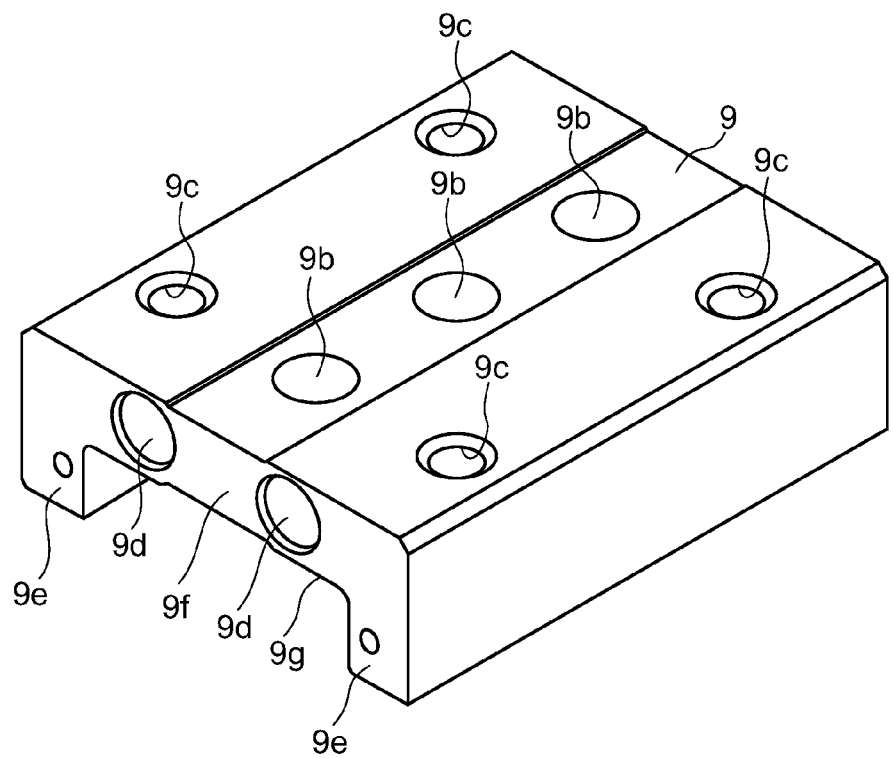
FIG. 9 is a perspective view of the mounting part.

FIG. 9 is a perspective view of the mounting part 9. The mounting part 9 is made of aluminum. As is different from the mounting part in the above-described exemplary embodiment, the mounting part 9 has a plate-shaped center part 9*f* and a pair of leg parts 9*e* hanging downward from respective end parts of the center part 9*f* in the width direction. At the lower part of the mounting part 9, a groove 9*g* is formed in which the rolling part 8 is inserted. In the upper surface of the mounting part 9, mounting screws 9*c* are formed for mounting the moving block 2 onto the counterpart device and countersunk holes 9*b* are formed for mounting the mounting part 9 onto the rolling part 8. The countersunk holes 9*b* are aligned on the center line of the mounting part 9. The mounting part 9 is manufactured in the same process steps as those in the above-described exemplary embodiment.

Figure 10:
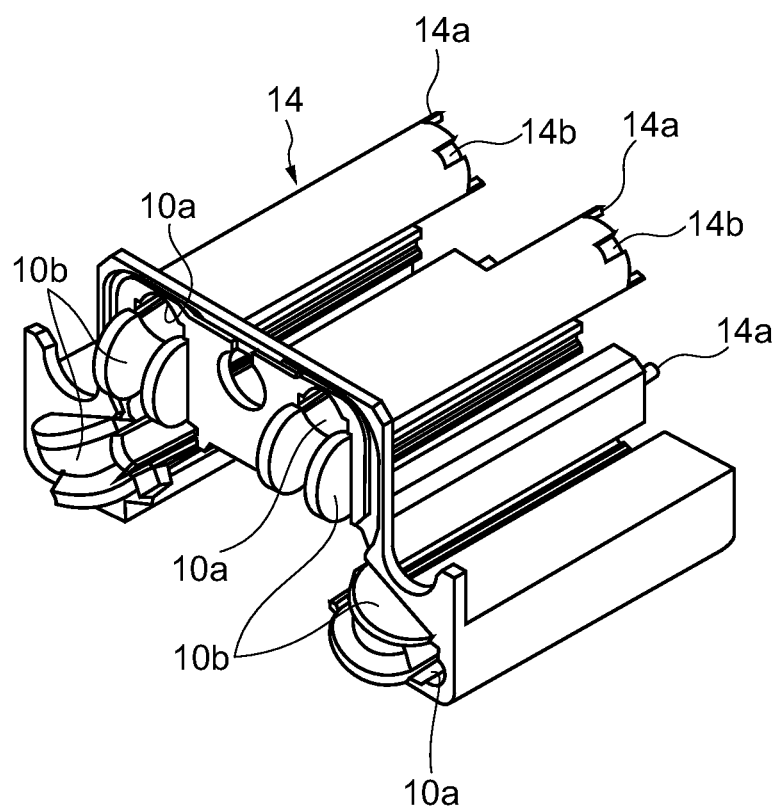
FIG. 10 is a perspective view of a split piece of a return part.
Figure 11:
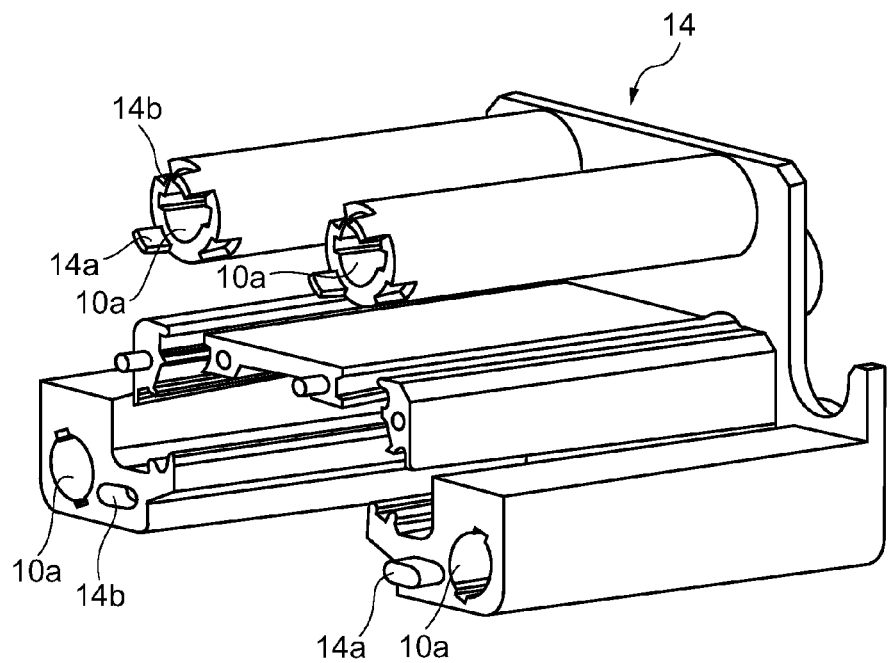
FIG. 11 is a perspective view of a split piece of a return part.

FIGS. 10 and 11 illustrate a resin-made return part 10. The return part 10 in this exemplary embodiment has two split pieces 14 which are split in the travelling direction of the moving block 2. Each split piece 14 has ball rolling parts 10*a* and inner circumferential sides 10*b* of the direction change passages formed therein. In each split piece 14, teeth-shaped positioning parts 14*a* and 14*b* are formed for positioning it with respective to the other split piece 14.

Figure 12:
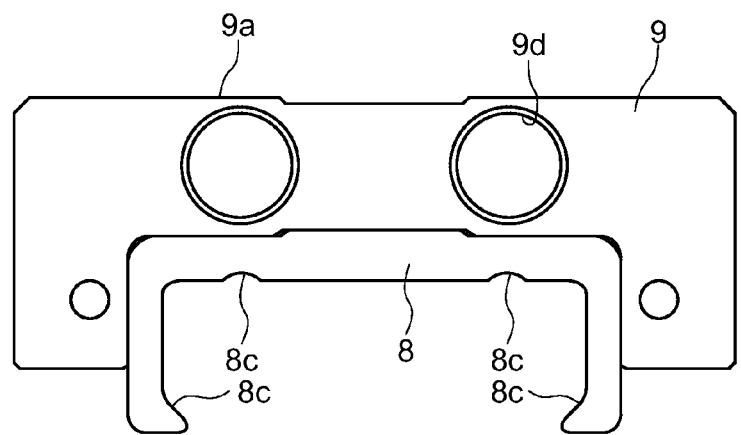
FIG. 12 is a side view illustrating the rolling part and the mounting part fastened to each other with a bolt.
Figure 13:
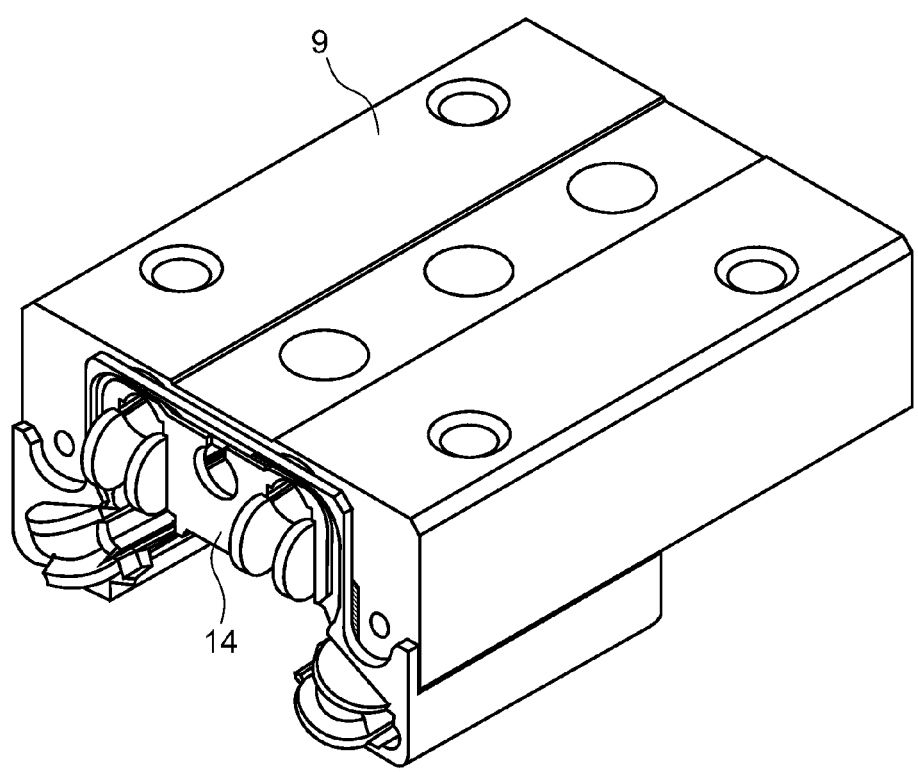
FIG. 13 is a perspective view illustrating the return part assembled into the rolling part and the mounting part.

FIG. 12 illustrates the rolling part 8 and the mounting part 9 which are connected to each other with bolts 12. After this, as illustrated in FIG. 13, the split piece 14 is inserted into the rolling part 8 and the mounting part 9 and fastened thereto with screws. Next, the other split piece 14 is inserted from the opposite side, positioned with respect to the first-inserted split piece, and then, fastened to the rolling part 8 and the mounting part 9 with screws. Like in this exemplary embodiment, the resin-made return part 10 may be built in the rolling part 8 and the mounting part 9, not be formed by insert molding.

Figure 14:
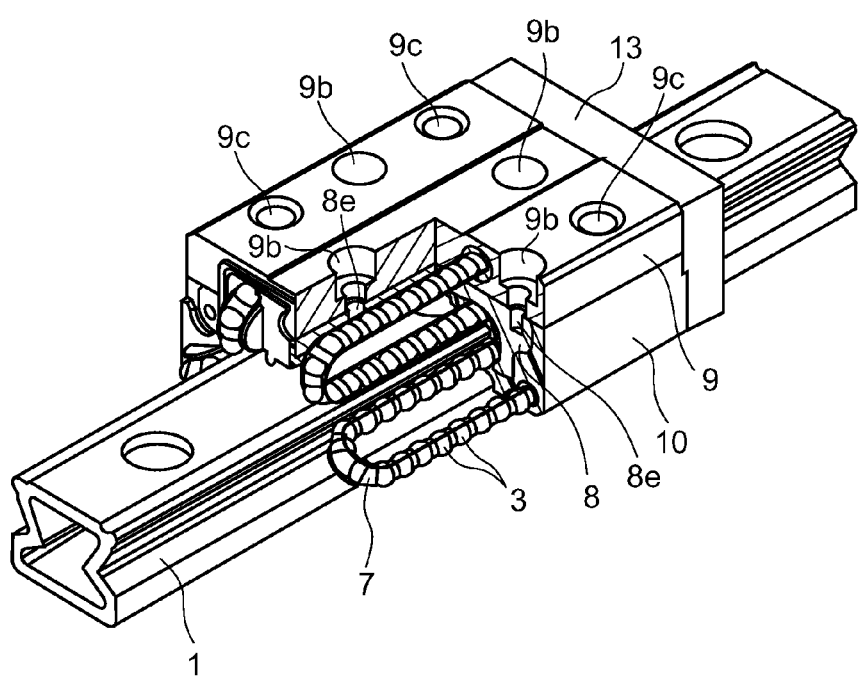
FIG. 14 is a perspective view illustrating a motion guide device according to a third exemplary embodiment of the present invention (including a partial cross-sectional view).

FIG. 14 illustrates a motion guide device according to a third exemplary embodiment of the present invention. In this exemplary embodiment, the positions of the countersunk holes 9*b* of the mounting part 9 and the positions of the screw parts 8*e* of the rolling part 8 are different from those in the above-described first exemplary embodiment. As the other parts are structurally the same as those in the first exemplary embodiment, they are denoted by like reference numerals and their description is omitted here. In this exemplary embodiment, out of four countersunk holes 9*b* of the mounting part 9, two countersunk holes 9*b* are arranged on the center line of the moving block 2. The other two countersunk holes 9*b* are arranged a fixed distance away from the center line of the moving block 2. The screw parts 8*e* of the rolling part 8 are positioned corresponding to the positions of the countersunk holes 9*b* of the mounting part 9. Like in this exemplary embodiment, the positions of the countersunk holes 9*b* of the mounting part 9 and the positions of the screw parts 8*e* of the rolling part 8 can be changed in various ways.

Figure 15:
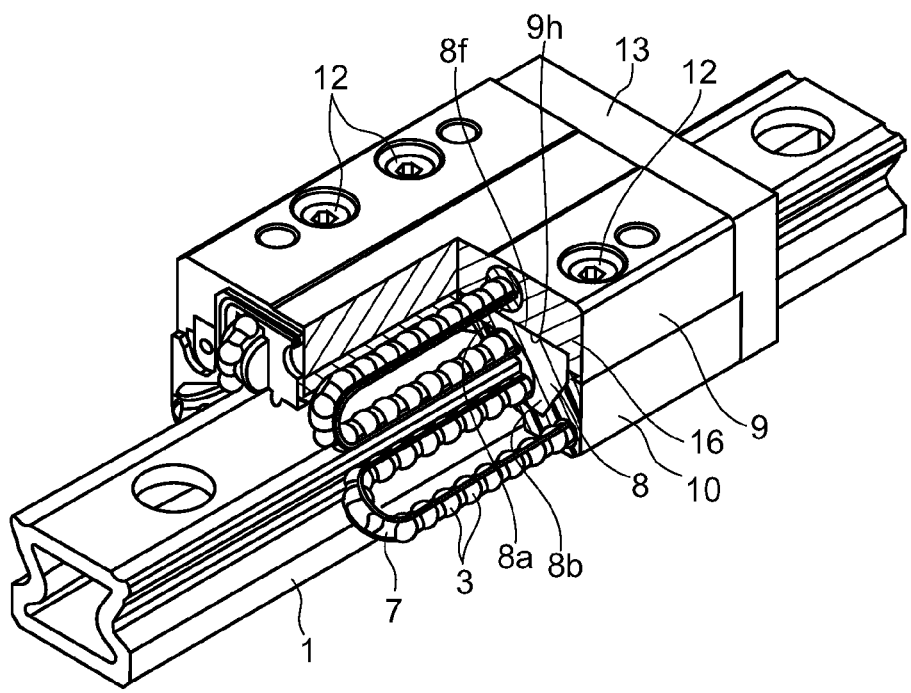
FIG. 15 is a perspective view illustrating a motion guide device according to a fourth exemplary embodiment of the present invention (including a partial cross-sectional view).
Figure 16:
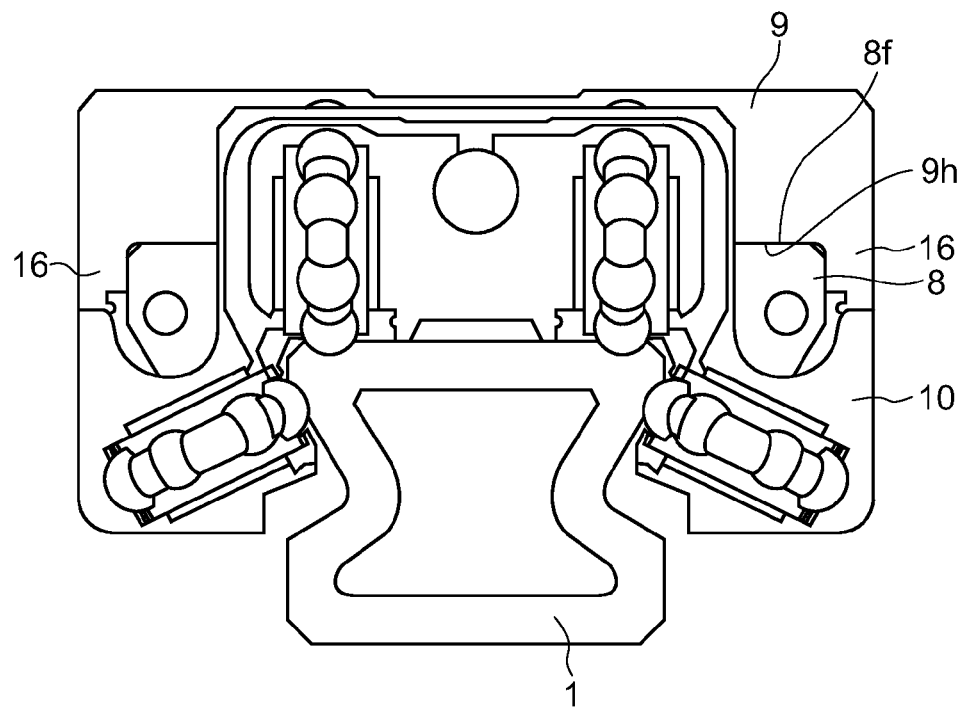
FIG. 16 is a front view of the motion guide device according to the fourth exemplary embodiment (an end plate is removed).

FIGS. 15 and 16 illustrate a motion guide device according to a fourth exemplary embodiment of the present invention. FIG. 15 is a perspective view of the motion guide device and FIG. 16 is a front view thereof. In both views, the end plate 13 is removed. In this exemplary embodiment, when seen in the longitudinal direction of the raceway rail 1, a stopper 16 is provided as displacement preventing means for preventing horizontal displacement of the mounting part 9 with respective to the rolling part 8.

In the motion guide device of the first exemplary embodiment illustrated in FIG. 1, the mounting part 9 is formed into a phase shape so as to enhance workability. On the lower surface of the plate-shaped mounting part 9, the rolling part 9 is provided connected with bolts. The moving block 2 bears not only a load in the radial direction (vertically upward) and in the reverse radial direction (vertically downward) but also a load in the horizontal direction. When the load in the horizontal direction is larger, it is sometimes difficult to bear the load in the horizontal direction only with the friction force of the bearing surfaces of the bolts 12. For this reason, in the present exemplary embodiment, the stopper 16 is provided for restraining the mounting part 9 and the rolling part 8 horizontally.

As illustrated in FIG. 16, at each of horizontally end parts of the mounting part 9 seen in the longitudinal direction of the raceway rail 1, a stopper 16 is provided jutting vertically from a joint surface 9*h* of the mounting part 9 with the rolling part 8. The rolling part 8 has a center part 8*a* facing the upper surface of the raceway rail 1 and a pair of leg parts 8*b* hanging down from the width-directional end parts of the center part 8*a* (see FIG. 15). The upper surface of the center part 8*a* of the rolling part 8 is a joint surface 8*f* with the mounting part 9. Each stopper 16 abuts to the side surface of the rolling part 8. The stopper 16 prevents the mounting part from being displaced from side to side relative to the rolling part 8 seen in the longitudinal direction of the raceway rail 1 while the joint surfaces 8*f* and 9*h* of the rolling part 8 and the mounting part 9 are arranged in a horizontal plane.

Figure 17:
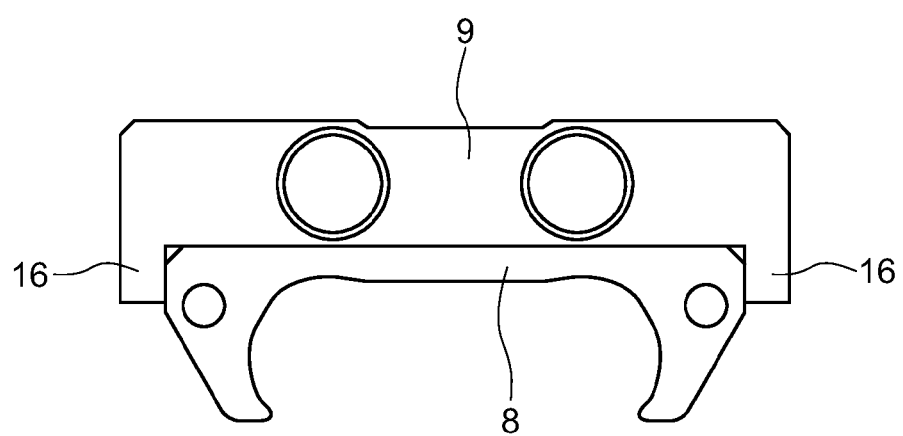
FIG. 17 illustrates a mounting part and a rolling part.

FIG. 17 illustrates the mounting part 9 and the rolling part 8 seen in the longitudinal direction of the raceway rail 1. As the stoppers 16 are provided, the mounting part 9 is prevented from being displaced from side to side with respect to the rolling part 8. A resistance force against the displacement is determined by flexural strength and shearing of the stoppers 16. The resistance force against the displacement can be achieved by setting the dimensions of each stopper 16 appropriately.

When in order to fit the mounting part 9 on the rolling part 8, the inner size of the stopper 16 in pair is larger than the outer size of the rolling part 8, there is a gap between the stoppers 16 and the rolling part 8. In a typical motion guide device, two raceway rails 1 are often used in parallel with each other (so-called two axes), and a load horizontally only in one direction is often applied to the moving blocks 2. For this reason, actually, the rolling part 8 is pushed against only one stopper 16 and there may be a gap between the rolling part 8 and the other stoppers 16. When the motion guide device is used like a one-axis type and the moving block 2 bears loads in horizontally both directions, it is preferable that the rolling part 8 may be pressed into the stoppers in pair or the gap may be filled with an adhesive agent.

Figure 18:
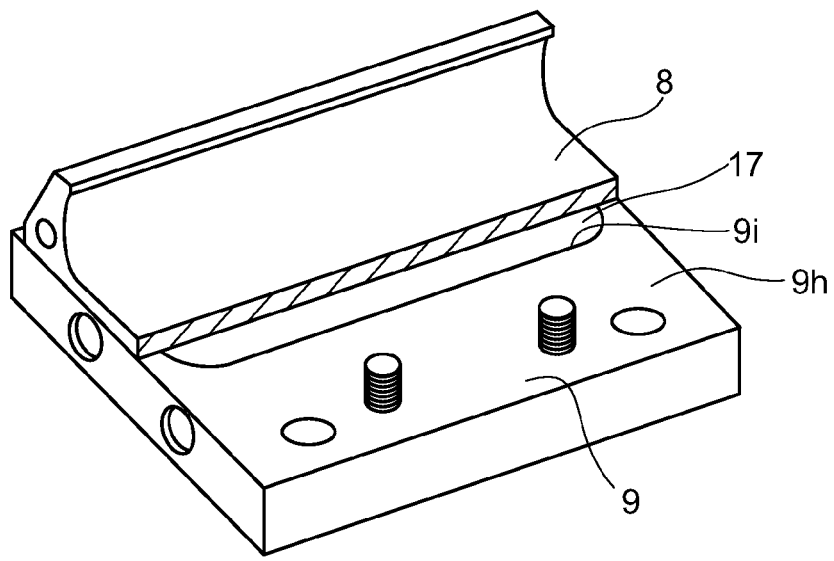
FIG. 18 illustrates another example of displacement preventing means (the mounting part and the rolling part are inverted.

FIG. 18 illustrates another example of the displacement preventing means. In FIG. 18, the mounting part 9 and the rolling part 8 are reversed and the cross section of the rolling part 8 is illustrated. In the joint surface 9*h* of the mounting part 9, an adhesive groove 9*i* is formed to have a predetermined area. The adhesive groove 9*i* is filled with an adhesive agent 17 for adhering the mounting part 9 and the rolling part 8 to each other. The adhesive agent 17 has high shearing strength. The resistance force against the displacement by setting the adhesion area and the strength of the adhesive agent 17 appropriately.

Figure 19:
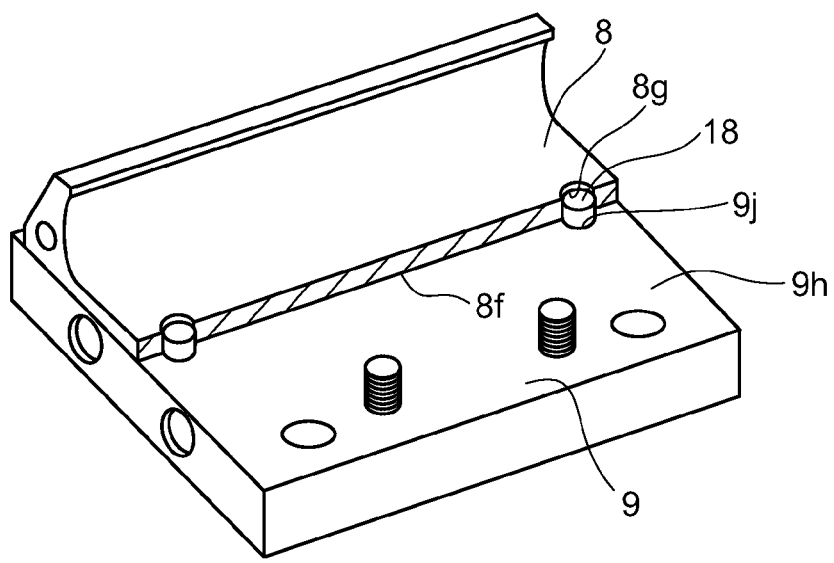
FIG. 19 illustrates yet another example of displacement preventing means (the mounting part and the rolling part are inverted.

FIG. 19 illustrates yet another example of the displacement preventing means. In the joint surfaces 9*h* and 8*f* of the mounting part 9 and the rolling part 8, respectively, holes 8*g* and 9*j* are formed in position. Engaged in these holes 8*g* and 9*j* are common pins 18. As the common pins 18 are fit between the mounting part 9 and the rolling part 8, the rolling part 8 and the mounting part 9 are prevented from being displaced. The resistance force against displacement can be achieved by setting the diameter of each of the holes 8*g* and 9*j* and the diameter of each pin 18 appropriately. The resistance force is determined by the shearing force of the pins 18 and the permissible contact pressure of the holes 9j of the mounting part 9 of low rigidity.

Figure 20:
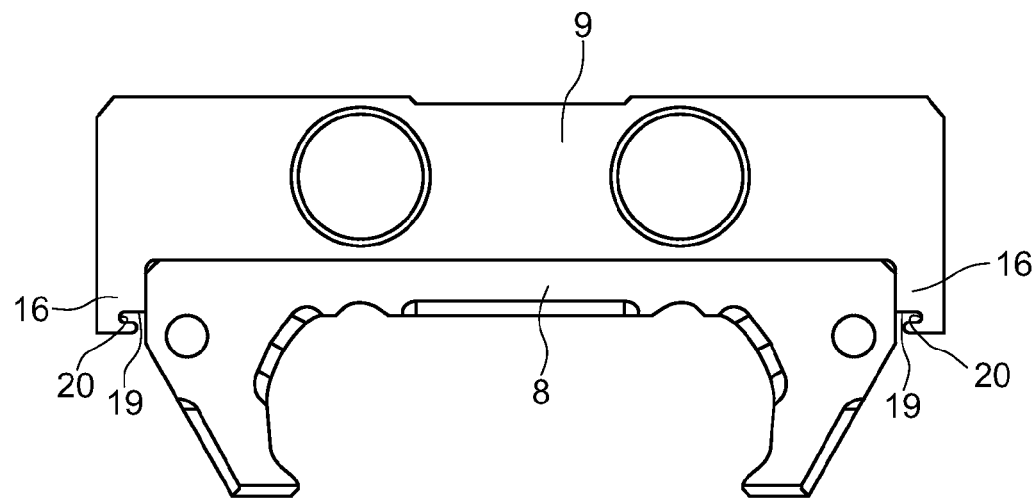
FIG. 20 is a detailed view of the mounting part and the rolling part.

FIG. 20 is a detailed view of the mounting part 9 and the rolling part 8. The resin joint surface 19 as the lower surface of each stopper 16 of the mounting part 9, a groove is formed in which resin flows in molding. After the mounting part 9 and the rolling part 8 are joined with bolts, a resin-made return part 10 is formed integral therewith. Resin is constricted after molding. Resin shrinkage is a physical phenomenon and called resin surface sink. In the return part 10, ball return passages 10a are formed as rolling-element return passages. When the resin is constricted, the ball return passages 10a are getting displaced after molding. In the end plate 13 attached to each end surface of the moving block 2, the direction change passage is formed connected to the ball return passage 10a. When the ball return passage 10a is displaced, its displacement may affect circulation of the balls 3 or prevent engagement with the end plate 13. Actually, when the resin joint surface 19 of the mounting part 9 is made flat and molded with resin, there has occurred a gap between the resin joint surface 19 and the return part 10 and the ball return passage 10a is displaced downward. The motion guide device as a whole is displaced in obliquely downward direction along the outer side surface of the leg part of the rolling part 8. This seems to be because after molding, the resin is constricted toward apart of larger percentage of resin (barycenter of resin).

Figure 21:
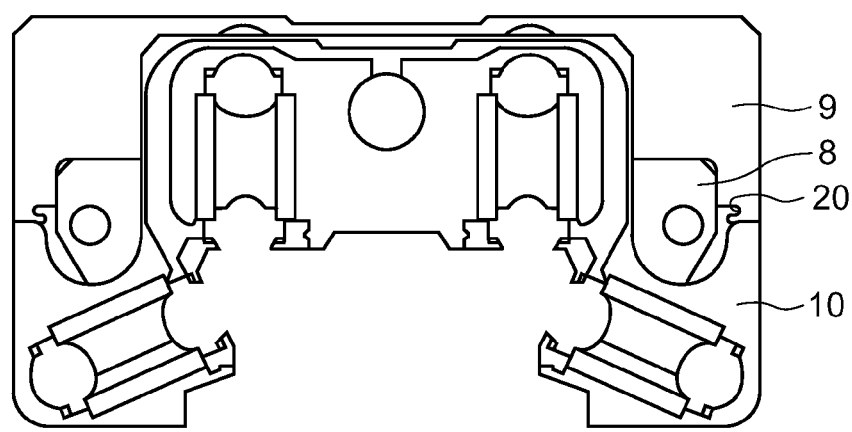
FIG. 21 illustrates a return part manufactured by resin molding on the mounting part and the rolling part.

Here, in this exemplary embodiment, formed in the resin joint surface 19 of the mounting part 9 is a groove 20 in which resin flows during molding, and the resin is caught in the groove 20 and prevented from being pulled downward. As illustrated in FIG. 21, when the groove 20 is formed actually and the return part 10 is formed of resin, it becomes possible to prevent a gap from occurring between the mounting part 9 and the return part 10 by shrinkage of the resin and to prevent the ball return passage 10a from being displaced.

Figure 22:
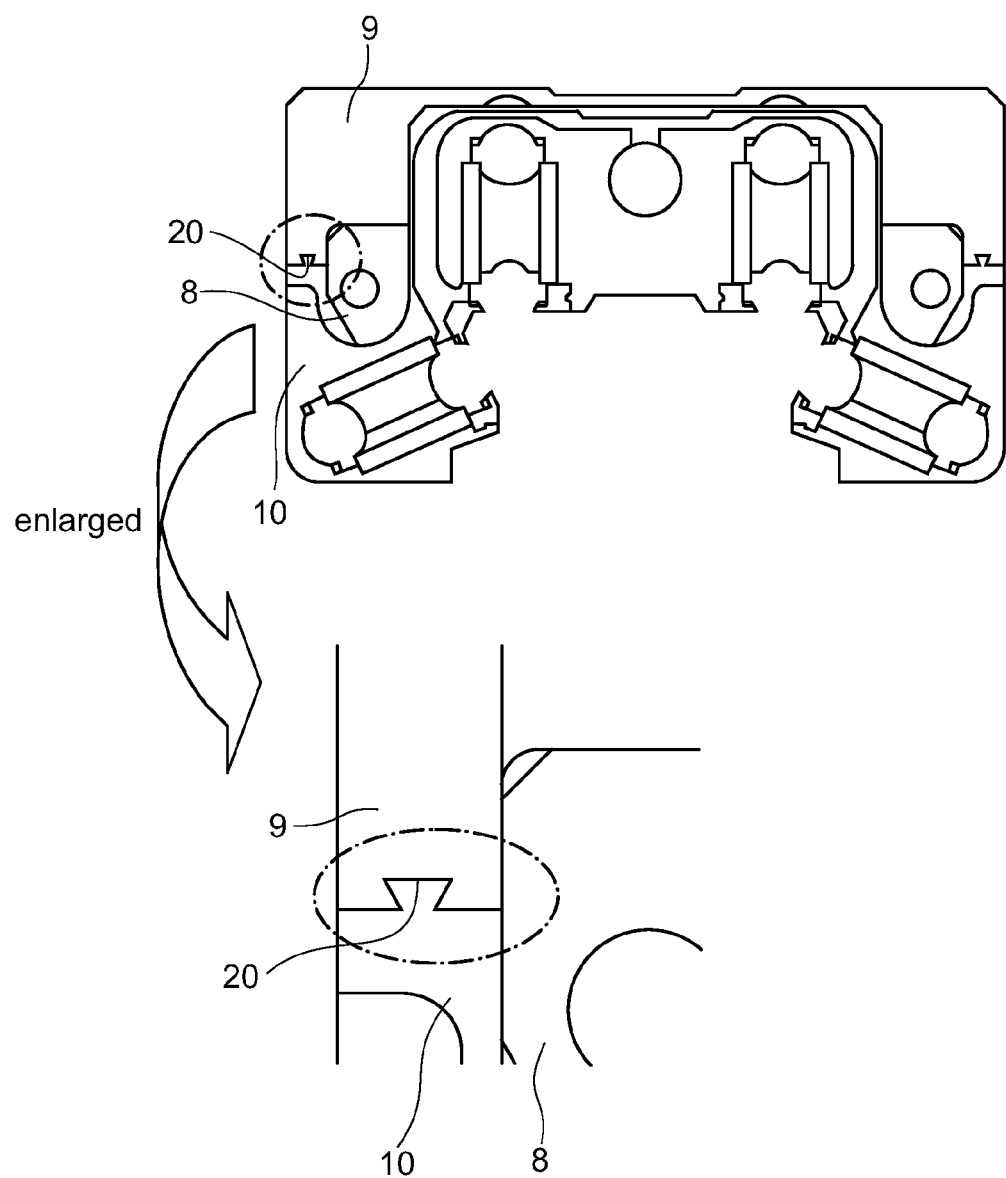
FIG. 22 illustrates another example of a groove (view of the return part manufactured by resin molding on the mounting part and the rolling part).
Figure 23:
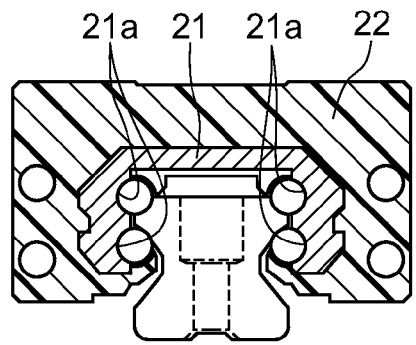
FIG. 23 is a cross-sectional view of a conventional motion guide device.
Figure 24:
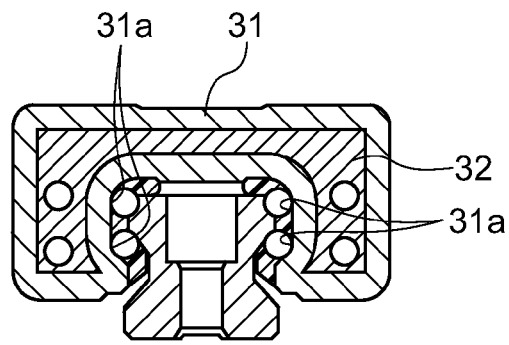
FIG. 24 is a cross-sectional view of a conventional motion guide device.
Figure 25:
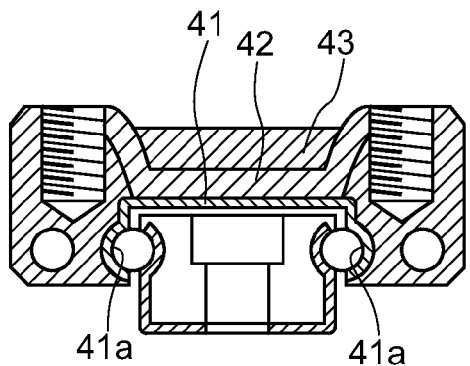
FIG. 25 is a cross-sectional view of a conventional motion guide device.

FIG. 22 illustrates another example of the groove 20 provided in the resin joint surface of the mounting part 9. The groove 20 of this example is formed into dovetail. The groove 20 may be provided only with something that catches the resin when the resin is pulled downward after molding.

Here, the present invention is not limited to the above-described exemplary embodiments and may be embodied in various forms without departing from the scope of the present invention. For example, in the above-described exemplary embodiments, the mounting part is integrally bolted to the rolling part. However, the mounting part may be integrally fastened to the rolling part by die casting in which the rolling part is used as a core. In this case, attention should be paid to problems of heat treatment of the rolling-element rolling parts, accuracy of mounting surface and pores that are easy to form.

In addition, the mounting part may be made of aluminum base alloy or ceramics, instead of aluminum.

Further, the rolling part and the mounting part may be joined with an adhesive agent, not with bolts.

Furthermore, arrangement and structure of the rolling-element rolling parts of the raceway rail and the moving block main body may be modified into various forms, and rollers may be used as rolling elements, instead of the balls.

Still furthermore, in the above-described exemplary embodiments, the motion guide device has been described by way of an example of the linear guide for guiding linear motion of the object to guide. However, the present invention may be applied to a curvilinear motion guide device for guiding curvilinear motion, and further to a ball spline and a roller spline.

The present application is based on Japanese Patent Application No. 2007-089736 filed on Mar. 29, 2007 and Japanese Patent Application No. 2007-240124 filed on Sep. 14, 2007, and their contents are incorporated by reference herein.

The invention claimed is:

1. A motion guide device comprising:
   a raceway member having a rolling-element rolling part wherein the raceway member also includes a base supporting the raceway member, and an upper surface of the raceway member substantially parallel from said base;
   a moving block having a loaded rolling-element rolling part facing the rolling-element rolling part and a rolling-element circulation passage including a rolling-element return passage extending approximately in parallel with the loaded rolling-element rolling part;
   a plurality of rolling elements arranged in the rolling-element circulation passage; and
   the moving block having
      a rolling part which is made of steel and has the loaded rolling-element rolling part,
      a return part which is made of resin and has the rolling-element return passage, and
      a mounting part which is connected to the rolling part, has a mounting surface for mounting the moving block onto a counterpart device, and is made of a material that has a specific gravity lower than that of the rolling part and is more rigid than that of the return part;
   the mounting part having a through hole extending in a travelling direction of the moving block, and at least a part of the return part being provided in the through hole; and
   wherein the rolling part is formed of a pair of leg parts hanging down from respective ends of a center part which is positioned therebetween, such that the orientation of the center part is positioned opposite from and substantially parallel to the upper surface of the raceway member.

2. The motion guide device according to claim 1, wherein the mounting part is connected to the rolling part with a plurality of bolts or an adhesive agent.

3. The motion guide device according to claim 2, wherein the mounting part is connected with the rolling part with the bolts, and
   in a plane view of the moving block, a plurality of mounting screws for mounting the moving block onto the counterpart device are arranged in the mounting surface of the mounting part to be bilaterally symmetric about a center line of the moving block in a travelling direction, and the bolts for connecting the rolling part and the mounting part are arranged bilaterally symmetric at a distance away from the center line of the moving block in the travelling direction in such a manner that the bolts are substantially near to the mounting screws.

4. The motion guide device according to claim 2, wherein the mounting part is connected to the rolling part with the bolts, and the motion guide device further comprises displacement preventing means for preventing the mounting part from being horizontally displaced relative to the rolling part when seen in a longitudinal direction of the raceway member while joint surfaces of the rolling part and the mounting part in contact with each other are arranged in a generally horizontal plane.

5. The motion guide device according to claim 4, wherein the displacement preventing means has an adhesive groove provided in at least one of the joint surfaces of the mounting part and the rolling part and an adhesive agent filled in the adhesive groove.

6. The motion guide device according to claim 4, wherein the displacement preventing means includes one or more pair of corresponding holes, wherein each pair includes one hole in the rolling part and a corresponding hole in the mounting part, and further wherein each pair receives a pin fit therein.

7. The motion guide device according to claim 4, wherein the displacement preventing means has a stopper jutting out of the joint surface of the mounting part in a vertical direction and abutting to a side surface of the rolling part.

8. The motion guide device according to claim 2, wherein
In the rolling part, a screw part is formed for fitting a bolt therein to connect the mounting part to the rolling part, and
In the mounting surface of the mounting part, a countersunk hole is formed for inserting the bolt thereinto.

9. The motion guide device according to claim 1, wherein the return part is formed of resin to be integral with the rolling part and the mounting part.

10. The motion guide device according to claim 9, wherein the mounting part has a resin joint surface connected to the return part, the resin joint surface having a groove into which resin flows in molding so as to prevent a gap from occurring between the resin joint surface and the return part due to shrinkage of the resin after molding.

11. The motion guide device according to claim 1, wherein each of the leg parts has a base part and a tip end part, the base part being thicker than the tip end part.

12. The motion guide device according to claim 1, wherein the mounting part is made of aluminum, aluminum base alloy, ceramics or FRP.

13. A method of producing a motion guide device having a raceway member having a rolling-element rolling part, wherein the raceway member also includes a base supporting the raceway member, and an upper surface of the raceway member substantially parallel from said base; a moving block having a loaded rolling-element rolling part facing the rolling-element rolling part and a rolling-element circulation passage including a rolling-element return passage extending approximately in parallel with the loaded rolling-element rolling part, and a plurality of rolling elements arranged in the rolling-element circulation passage, the method comprising:
a first connecting step of connecting a mounting part to a rolling part made of steel, the steel rolling part including the loaded rolling-element rolling part, the mounting part having a mounting surface for mounting the moving block onto a counterpart device and being made of a material that has a lower specific gravity than that of the rolling part and is more rigid than that of a return part made of resin having the rolling-element return passage; and
a second connecting step of connecting the return part made of resin having the rolling-element return passage to the rolling part and the mounting part
wherein the mounting part has a through hole extending in a travelling direction of the moving block, and at least part of the return part is provided in the through hole; and
wherein the rolling part is formed of a pair of leg parts hanging down from respective ends of a center part which is positioned therebetween, such that the orientation of the center part is positioned opposite from and substantially parallel to the upper surface of the race way member.

14. The method according to claim 13, wherein in the first connecting step, the rolling part is connected to the mounting part with a plurality of bolts or an adhesive agent.

15. The method according to claim 13, wherein in the second connecting step, the return part made of resin is formed of resin to be integral with the rolling part and the mounting part.

16. The method according to claim 13, further comprising: after the first connecting step of connecting the mounting part to the rolling part, a rolling part finishing step of forming the loaded rolling-element rolling part of the rolling part by grinding.

\* \* \* \* \*